United States Patent Office 3,082,184
Patented Mar. 19, 1963

3,082,184
COATING COMPOSITION COMPRISING AN ALCOHOL-MODIFIED AMINOPLAST RESIN AND A COPOLYMER OF A β-HYDROXYPROPYL ACRYLIC ESTER AND AN ACID, AND METAL COATED THEREWITH
Dominic Richard Falgiatore and Allen M. Levantin, Philadelphia, Pa., assignors to Rohm & Haas Company, Philadelphia, Pa., a corporation of Delaware
No Drawing. Filed Jan. 9, 1959, Ser. No. 785,798
19 Claims. (Cl. 260—30.4)

This invention is concerned with thermosetting coating compositions comprising an alkylated aminoplast resin-forming condensate and a thermoplastic copolymer of (1) a β-hydroxypropyl ester of acrylic or methacrylic acid, (2) an α,β-unsaturated carboxylic acid, and (3) one or more other monoethylenically unsaturated copolymerizable compounds containing a $CH_2=C=$ group.

Frazier et al. in United States Patent 2,681,897 disclose thermosetting coating compositions comprising an alkylated aminoplast and a thermoplastic copolymer of a hydroxyalkyl ester of acrylic or methacrylic acid, which copolymer contains primary hydroxyl groups, that is groups of the formula $—CH_2OH$. It has been found that coatings obtained from such compositions are unreliable in respect to the production of gloss. This apparently involves instability on standing so that widely different gloss values or ratings are obtained if the coating composition is allowed to stand various lengths of time after compounding before application. While a composition made in accordance with this patent at times may produce a certain glossiness, it is difficult, if not impossible, to reproduce coatings having the same glossiness even though they are made from what was believed to be the same composition originally. It is an object of the present invention to provide compositions which are far more reliable in their capacity to produce glossy films and which are capable of producing even higher glossiness than those obtainable from the compositions of the patent.

In accordance with the present invention, it has been discovered that coating compositions comprising an alkylated aminoplast and a thermoplastic copolymer containing 5 to 30% by weight of β-hydroxypropyl acrylate or methacrylate, from 1 to 4% of a copolymerizable α,β-unsaturated carboxylic acid, and one or more other copolymerizable monoethylenically unsaturated compounds containing a $CH_2=C=$ group which latter compounds are devoid of primary alcoholic hydroxyl groups and in which copolymer the maximum content of units containing secondary hydroxyl groups is 30% by weight, produce coatings having outstanding gloss even when highly pigmented. Also, the production of highly glossy coatings employing the compositions of the present invention is highly reliable and readily reproducible.

The composition of the copolymer, as stated, includes from 5 to 30% of β-hydroxypropyl acrylate or methacrylate which may be represented generically by the formula

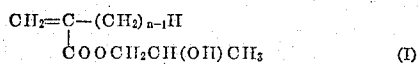

(I)

in which $n$ is an integer having a value of 1 to 2. The copolymer may contain as much as 30% by weight of units containing secondary hydroxyl groups which may include units derived from β-hydroxypropyl vinyl ether or sulfide. However, the compound is devoid of monomers containing primary hydroxyl groups, that is those having units of the formula $—CH_2OH$.

Any copolymerizable unsaturated acid may be used in preparing the copolymer including maleic acid, fumaric acid, aconitic acid, citraconic acid, crotonic acid; but for most practical purposes acrylic acid, methacrylic acid, or itaconic acid is preferred.

Other monoethylenically unsaturated compounds copolymerizable with the hydroxyl and acid monomers which may be used include esters of acrylic acid or methacrylic acid with cyclohexanol, benzyl alcohol, or alkanols having 1 to 18 carbon atoms; acrylonitrile or methacrylonitrile, styrene, vinyltoluene, α-methyl styrene, and so on. The hardness, flexibility, toughness, and adhesion for various substrates can be varied widely as desired by suitably adjusting the proportions of these various monomers. For example, a copolymer containing 94% of an ester of acrylic acid such as methyl, ethyl, or butyl acrylate with 5% of β-hydroxypropyl acrylate or methacrylate and 1% of one of the acids mentioned produces films which are extremely flexible and adherent. On the other hand, a copolymer of 96% by weight of methyl methacrylate with 5% by weight of β-hydroxypropyl acrylate or methacrylate and 1% of one of the acids produces an extremely hard film, which is suitable for relatively rigid substrates but is insufficiently flexible to be applied to highly flexible substrates such as of paper, leather, or textiles.

The copolymers may be prepared in any suitable fashion. They should have a molecular weight in the range of about 10,000 to about 130,000 viscosity average and for this purpose solution polymerization, particularly in a solvent which may be employed as the solvent for the coating application, is generally preferred. The monomers comprising the unsaturated acid, the β-hydroxypropyl acrylate or methacrylate, and the other monoethylenically unsaturated compounds in the proportions needed to give the composition hereinabove defined are mixed in the solvent at a concentration of about 10 to 60% total monomer in the entire solution and any suitable free-radical initiator soluble in the solvent is introduced. The initiator may be an azo catalyst, a peroxygen compound, such as t-butyl peracetate, or a peroxide, such as benzoyl peroxide, or a hydroperoxide, such as t-butyl hydroperoxide, or cumene hydroperoxide. The solution is heated to reflux to effect copolymerization and held at reflux for a period of 2 to 6 hours or more. Thereafter, the solution of the copolymer may be cooled and the aminoplast solution prepared as described hereinabove may be introduced with adjustment of the solvent content to provide the concentration desired. Pigments, extenders, curing catalysts, and any other adjuvants may then be added.

The alkylated aminoplasts which may be used include those obtained by the alkylation, with an alkanol having from 1 to 6 carbon atoms or cyclohexanol, of a condensate of an aldehyde with urea, N,N'-ethyleneurea, dicyandiamide, and aminotriazines. Both water-soluble and water-insoluble alkylated aminoplast condensates may be employed provided they are soluble in the organic solvent employed in making the coating compositions. Thus, such water-soluble condensates as the methylated dimethylolurea condensates can be employed provided the alkylation with methanol is sufficiently complete, and preferably substantially 100%, to render the alkylated condensate soluble in the organic solvents mentioned hereinafter. In general, the alkylated condensates should have at least 80% and preferably 100% of the methylol groups alkylated with cyclohexanol or an alkanol having 1 to 6 carbon atoms. Preferably, the alkylation products of alcohols having from 3 to 6 carbon atoms are employed and the butylated products are particularly valuable because of their greater compatibility with a wide range of copolymers and solvents mentioned hereinafter.

Among the aminotriazines which are suitable are melamine, acetoguanamine, benzoguanamine, formoguanamine, N-(t-butyl)-melamine, N-(t-octyl)-melamine in which the t-octyl group has the formula $$-C(CH_3)_2-CH_2-C(CH_3)_3$$

ammeline, 2-chloro-4,6-diamino-1,3,5-triazine, 2-phenyl-p-oxy-4,6-diamino-1,3,5-triazine, 6-methyl-2,4-diamino-1,3,5-triazine, 2,4,6-trihydrazine-1,3,5-triazine, 2,4,6-triethyltriamino-1,3,5-triazine, and the N,N-di-($C_1$-$C_4$)alkyl melamines such as N,N-dimethylmelamine. While any aldehyde may be employed such as acetaldehyde, crotonaldehyde, and acrolein, the condensates obtained using formaldehyde and revertible polymers thereof such as paraformaldehyde are preferably employed.

The copolymer and the aminoplast condensate are dissolved in an organic solvent in the proportions of 50 to 95 parts of copolymer to 50 to 5 parts respectively of the condensate. The proportions in which any particular alkylated aminoplast and any particular copolymer are mixed must also be selected so as to provide compatibility of these two components in the coating solution as well as in the final film. Any suitable concentration of the copolymer and aminoplast in the solvent may be employed such as from 1 to 50% by weight. If a pigment is present, the total solids concentration in the coating composition may be from 5 to 75% by weight. The ratio of pigment to binder (using the latter term to embrace the copolymer and the aminoplast condensate) may be from 1:20 to 20:1.

The solvents that may be employed include such hydrocarbons as benzene, toluene, xylenes, and aromatic naphthas or mixtures of such solvents; esters such as ethyl, butyl, amyl, ethoxyethyl, or methoxyethyl acetates, lactates, or propionates; ketones such as acetone, methyl isopropyl ketone, methyl isobutyl ketone, dioxane, isophorone, and cyclohexanone; alcohols such as n-butanol, t-butanol, isopropyl alcohol, n-propyl alcohol, amyl alcohols, and cyclohexanol; ethers such as diethyl ether, the monoethyl ether of ethylene glycol, the monomethyl ether of ethylene glycol, and the monobutyl ether of ethylene glycol; and miscellaneous solvents including dimethylformamide, dimethylacetamide, acetonitrile, nitromethane, nitroethane, nitropropane, and nitrobutane; as well as mixtures of two or more solvent materials either from the same group or any or all of the groups just listed.

Pigments suitable for use according to the invention are inorganic pigments such as, for example, chrome yellows, Prussian blues and Brunswick greens, titanium pigments such as titanium dioxide, extended titanium pigments (extended with either precipitated or natural extenders, such as alkali earth sulphates for instance calcium sulphate, barium sulphate, and the like), tinted titanium pigments, titanates such as barium, zinc, lead, magnesium titanates, and the like. Additionally, other types of inorganic pigments might be included, such as zinc sulphide pigments, for instance, zinc sulphide, lithopone, other extended zinc sulphide pigments, such as calcium base lithopone, zinc sulphide extended with natural extenders, and the like, zinc oxide and antimony oxide, or organic pigments, that is organic coloring matters which are devoid of sulphonic, carboxylic, or other water-solubilizing groups. Also, for the purposes of this invention, we include within the term "pigment" other water-insoluble organic coloring matters such as, for example, the calcium or barium lakes of azo lake dyestuffs.

The compositions of the present invention are adapted to be applied in any suitable fashion to the substrate to be coated such as by brushing, spraying, dipping, roller coating, or the like, then dried and finally cured by baking. Generally, it is unnecessary to add any other material to catalyze the reaction but, if desired, an acidic catalyst may be included. The amount of such a catalyst may be from 0.1 to 1% by weight, based on the weight of aminoplast condensate. The use of the curing catalyst may be particularly desirable when lower temperatures of curing or baking are needed. With such curing catalysts, insolubilization can be accomplished simply by drying and ageing at room temperature. Amongst the curing catalysts that may be used to cure the composition of the present invention are any of the acid catalysts and, included in that group, are the organic and the inorganic acid catalysts. One may use, for instance, in catalytic amounts, sulfuric acid, hydrochloric acid and their acid salts, such as ammonium sulfate, ammonium chloride, or the organic acids, such as acetic acid, phthalic acid, benzoic acid, toluene sulphonic acid, naphthalene sulphonic acid, and the mono-salt of maleic acid with triethylamine.

The compositions herein may be applied for the coating of a wide variety of substrates including paper, textiles, leather, wood, ceramics, brick, stone, and concrete surfaces, as well as metals. They are particularly valuable for application as finishing topcoats for automobiles or for the decoration of metals in general, such as tin cans or other canisters.

As stated above, the compositions, after application to the substrate to be coated, are dried and cured. If a curing catalyst is present, such drying and curing may be carried out simply at room temperatures. However, whether or not a catalyst is present, drying may be effected at elevated temperatures such as at 140° F. up to 220° F.; and baking may be effected at temperatures anywhere from 180° to 450° F. As is obvious from the preceding statement, drying and curing may be considered as part of one operation, the curing following the drying immediately. The time of curing may vary from a period as short as one-half to two minutes at the upper range of temperature around 450° F. up to one hour or two at the lower portion of the temperature range given, namely 180° F. A particularly practical curing operation is effected at 300° F. for a period of 15 to 30 minutes or so.

The examples immediately following illustrate the preparation of several aminoplast-type condensates, but it is to be understood that the preparation of such condensates is not in itself part of the present invention since conventionally-available alkylated aminoplast condensates can be employed. The following resins designated A through D are merely typical of alkylated aminoplast resins that can be employed herewith. In these examples, the parts and percentages are by weight unless otherwise clearly indicated.

EXAMPLE A (RESIN A)

*Preparation of Methoxymethyl Melamine in Butanol*

Charge:  Moles
A. 1070.0 g. flake paraformaldehyde _____ 32.5
B. 2400.0 g. methanol _____ 75.0
C. 630.0 g. melamine _____ 5.0
D. 5.0 ml. 50% formic acid.
E. 620.0 g. n-butanol for dilution.

Materials A, B, C, and D were charged to a glass reaction vessel equipped with thermometer, mechanical stirrer and reflux condenser. The mixture was heated to reflux and held at reflux temperature for about 3½ hours. At the end of this time, the heat was shut off and the pH of the system adjusted to 9 to 10 with triethylamine (about 12.0 grams required).

The reaction mixture was then stripped under reduced pressure (about 20 to 30 mm. Hg) to about 82 to 85% solids (about 2,400 grams of solvent was distilled off), then cut back to about 60% solids with butanol "E." Yield: 2,320 grams of product at 61.6% solids, viscosity 2.5 poises. The product was filtered through Super-Cel.

EXAMPLE B (RESIN B)

126 parts of melamine and 405.5 parts of formalin (a 37% aqueous solution of formaldehyde) and 440 parts of n-butanol are introduced into a suitable reaction chamber equipped with thermometer, stirrer, reflux condenser, and a suitable water trap through which the reflux condensate passes on its return to the reaction chamber and in which the essentially aqueous fraction of the condensate may be separated from the essentially non-aqueous fraction. Means are provided so that the former fraction may be drawn off if desirable. The reaction mixture is refluxed to a temperature of about 91° to 93° C. at atmospheric pressure for 6 to 8 hours. The water is removed by azeotropic distillation from the reaction mixture during the reflux operation. The vapor temperature will be about 100° to 105° C. The pressure is lowered sufficiently to reduce the vapor temperature to about 85° to 90° C. and the resin solution is concentrated to about 50% solids by vacuum distillation.

EXAMPLE C (RESIN C)

3370 parts of a 37% aqueous formaldehyde solution are charged into a suitable reaction chamber and neutralized to a pH of 8.6 with 20% sodium hydroxide and there is then added 6 parts of an 85% phosphoric acid solution. The mixture is heated to 70° C. and 1200 parts of urea are added over a one hour period. The mixture is then heated to 85° C. and held at that temperature for approximately one hour. 1340 parts of butanol are added and the mixture is heated to reflux and held at that temperature for approximately one hour. 1550 additional parts of butanol are added and the mixture is distilled, while replacing distillate with a feed of dry butanol, until the batch temperature reaches about 112° C. The batch is then vacuum concentrated at 90° C. to approximately 65% resin solids. This solution is diluted with xylene and butanol to give a final composition of 20% xylene, 30% butanol, and 50% resin solids.

EXAMPLE D (RESIN D)

1554 parts of a 37% aqueous formaldehyde solution with a pH adjusted to about 8 with sodium hydroxide is introduced into a suitable reaction chamber. Thereafter, 654 parts of benzoguanamine, 3 parts of magnesium carbonate, 945 parts of n-butanol and 122 parts of benzene are introduced. The reaction is heated under reflux decantation until 700 parts of water are drawn off. Seven parts of phthalic acid are then added and the heating under decantation is continued until practically all of the water (1300 parts) has been removed. The reaction mass is then cooled to about 70° to 80° C. and then filtered. The yield is about 1950 parts of resin solution containing 61 to 63% solids.

The following examples illustrate the preparation of copolymers of β-hydroxypropyl acrylate or β-hydroxypropyl methacrylate, an unsaturated acid, and other copolymerizable material, the parts and percentages being by weight unless otherwise noted.

EXAMPLE E (COPOLYMER E)

A charge comprising 263.5 grams (36.1 weight percent) of methyl methacrylate; 263.5 grams (36.1 weight percent) of styrene; 108.1 grams (14.8 weight percent) of ethyl acrylate; 80.3 grams (11.0 weight percent) of β-hydroxypropyl methacrylate; 14.6 grams (2.0 weight percent) of itaconic acid; 10.95 grams (1.5% of total monomer charge) of benzoyl peroxide; and 164.0 grams of the monomethyl ether of ethylene glycol, is added in the course of two hours to a glass reaction vessel containing 566.0 grams of xylene maintained at 105° to 107° C. by means of external heating. The mixture in the flask is stirred during the addition and subsequent reaction and maintained at 105° to 107° C. under a nitrogen atmosphere. Two and a half hours after the start of the polymerization, the reaction is recatalyzed with 0.73 gram of additional benzoyl peroxide and the temperature maintained at 109° to 110° C. At the end of the fourth hour, the reaction is again recatalyzed with an additional 0.73 gram of benzoyl peroxide. Heating and stirring are continued for a total of twelve hours. The final composition is a clear, viscous solution of a copolymer of about 36% methyl methacrylate, 36% styrene, 15% ethyl acrylate, 11% of β-hydroxypropyl methacrylate, and 2% itaconic acid, having a viscosity of about 10 poises at approximately 50% copolymer solids in a xylene/2-methoxy-ethanol: 77.6/22.4 (weight ratio) solvent system.

EXAMPLE F (COPOLYMER F)

The procedure used for making Copolymer E is repeated substituting for the 80.3 grams (11.0 weight percent) of β-hydroxypropyl methacrylate, 80.3 grams (11.0 weight percent) of β-hydroxypropyl acrylate. A similar solution of a copolymer of about 36% methyl methacrylate, 36% styrene, 15% ethyl acrylate, 11% of β-hydroxypropyl acrylate, and 2% itaconic acid, is obtained.

The following examples in which all parts and percentages are by weight unless otherwise indicated are illustrative of the invention.

EXAMPLE 1

(a) Mix 200 parts of rutile titanium dioxide with 200 parts of the 50% solution of Copolymer E (Example E) on a three-roll mill. Then mix into this paste 155.2 parts of the 50% solution of Copolymer E with 88.8 parts of the 50% solution of butylated methylol melamine (Resin B), 195.8 parts of xylene, and 97.9 parts of 2-ethoxyethyl acetate. Adjust to a spray viscosity of 22 seconds (No. 4 Ford cup) by adding a mixture of xylene and 2-ethoxyethyl acetate (6.9:3.1 weight ratio) giving a total solids concentration of 45%. Spray the composition on bonderized steel panels to give a film thickness of 0.0015 inch after a 15-minute air-dry and a 30-minute bake at 300° F. The glossiness as determined by a 60° photovolt glossimeter manufactured by the Photovolt Corporation is 90. The same 90 photovolt gloss is obtained whether the coating composition is applied to the panels immediately after compounding or a week or even a month or more after compounding.

(b) For comparison purposes, a coating composition is compounded and applied in the same way as in part (a) hereof except that the copolymer is substituted by a copolymer of 36.1 parts of methyl methacrylate, 36.1 parts of styrene, 14.8 parts of ethyl acrylate, and 11.0 parts of β-hydroxyethyl methacrylate. Coatings obtained on application immediately after compounding have a photovolt gloss of 90, but coatings obtained on application of the composition after standing one week have a photovolt gloss of 10.

EXAMPLE 2

The procedure of Example 1(a) is repeated substituting 416 parts (in 200-part and 216-part batches) of a 50% solution of copolymer F for the two batches of copolymer E solution and 60 parts of the 61.6% solution of methoxymethyl melamine (Resin A) for the butylated methylol melamine. Similar high gloss coatings are obtained whether the compositions are applied immediately or a week after compounding.

EXAMPLE 3

(a) The procedure of Example 1(a) is repeated substituting 416 parts (in 200-part and 216-part batches) of a 50% solution (in a 77.6:22.4 ratio mixture of xylene/2-methoxymethanol) of a copolymer of 44 parts of methyl methacrylate, 44 parts of styrene, 10 parts of β-hydroxypropyl methacrylate, and 2 parts of methacrylic acid for the copolymer solution there used and substituting 60 parts of the 61.6% solution of methoxymethyl melamine (Resin A) for the butylated methylol melamine. Coatings obtained by application immediately after compounding have a gloss of 90 photovolts. Coatings obtained by application of the composition after standing one week after compounding also have a 90 photovolt gloss.

(b) Part (a) hereof is repeated except that the copolymer is replaced with the same amount of a copolymer of 45 parts methyl methacrylate, 45 parts of styrene, and 10 parts of β-hydroxyethyl methacrylate. Coatings obtained by application of the composition immediately after compounding show a photovolt gloss of 44. Coatings obtained from the composition allowed to stand one week after componnding show a photovolt gloss reading of 10.

EXAMPLE 4

Example 1(a) is repeated using as the copolymer a copolymer of 78 parts of methyl methacrylate, 15 parts of ethyl acrylate, 5 parts of β-hydroxypropyl methacrylate, and 2 parts of acrylic acid and using as the aminoplast, Resin D (Example D). Similar results in glossiness are obtained whether the compositions are applied immediately, or a week, after compounding.

EXAMPLE 5

Example 1(a) is repeated using as the copolymer a copolymer of 14 parts of methyl methacrylate, 14 parts of vinyltoluene, 50 parts of ethyl acrylate, 24 parts of β-hydroxypropyl acrylate, and 1 part of aconitic acid and using Resin C (Example C) as the aminoplast. Similar results in glossiness are obtained whether the compositions are applied immediately, or a week, after compounding.

EXAMPLE 6

Example 1(a) is repeated using as the copolymer a copolymer of 20.5 parts of acrylonitrile, 20.5 parts of α-methylstyrene, 45 parts of ethyl acrylate, 10 parts of β-hydroxypropyl methacrylate, and 4 parts of acrylic acid. Similar results in glossiness are obtained whether the compositions are applied immediately, or a week, after compounding.

It is to be understood that changes and variations may be made without departing from the spirit and scope of the invention as defined by the appended claims.

We claim:

1. A composition comprising a compatible mixture of (A) 50 to 95% by weight of a thermoplastic copolymer of a mixture of 5 to 30% by weight of a compound of the formula

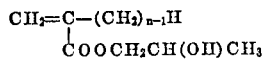

wherein $n$ is an integer having a value of 1 to 2, 1 to 4% by weight of a copolymerizable monoethylenically α,β-unsaturated acid selected from the group consisting of acrylic acid, methacrylic acid, itaconic acid, and aconitic acid, and the balance, to make 100%, of at least one other copolymerizable monoethylenically unsaturated compound selected from the group consisting of esters of acrylic acid with a member selected from the group consisting of cyclohexanol, benzyl alcohol and ($C_1$–$C_{18}$)-alkanols, esters of methacrylic acid with a member selected from the group consisting of cyclohexanol, benzyl alcohol and ($C_1$–$C_{18}$)-alkanols, styrene, vinyltoluene, α-methylstyrene, acrylonitrile, and methacrylonitrile, and (B) 5 to 50% by weight of a thermosetting alcohol-modified aminoplast resin condensation product of formaldehyde with a member selected from the group consisting of urea, N,N′-ethyleneurea, dicyandiamide, and aminotriazines, alkylated by an alcohol selected from the group consisting of cyclohexanol and alkanols having 1 to 6 carbon atoms.

2. A composition suitable for coating purposes comprising a solution in an organic solvent of 1 to 50% by weight of a compatible mixture of (A) 50 to 95% by weight of a thermoplastic copolymer, having a viscosity average molecular weight of about 10,000 to 130,000, of a mixture of monomers consisting essentially of 5 to 30% by weight of a compound of the formula

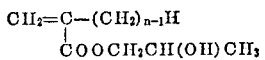

wherein $n$ is an integer having a value of 1 to 2, 1 to 4% by weight of a copolymerizable monoethylenically α,β-unsaturated acid selected from the group consisting of acrylic acid, methacrylic acid, itaconic acid, and aconitic acid, and the balance, to make 100%, of at least one other copolymerizable monoethylenically unsaturated compound selected from the group consisting of esters of acrylic acid with a member selected from the group consisting of cyclohexanol, benzyl alcohol and ($C_1$–$C_{18}$)-alkanols, esters of methacrylic acid with a member selected from the group consisting of cyclohexanol, benzyl alcohol and ($C_1$–$C_{18}$)-alkanols, styrene, vinyltoluene, α-methylstyrene, acrylonitrile and methacrylonitrile, and (B) 5 to 50% by weight of a thermosetting alcohol-modified aminoplast resin condensation product of formaldehyde with a member selected from the group consisting of urea, N,N′-ethyleneurea, dicyandiamide, and aminotriazines, alkylated by an alcohol selected from the group consisting of cyclohexanol and alkanols having 1 to 6 carbon atoms.

3. A composition suitable for coating purposes comprising a solution in an organic solvent of 1 to 50% by weight of a compatible mixture of (A) 50 to 95% by weight of a thermoplastic copolymer, having a viscosity average molecular weight of about 10,000 to 130,000, of a mixture of 5 to 30% by weight of a compound of the formula

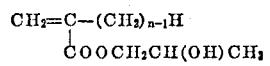

wherein $n$ is an integer having a value of 1 to 2, 1 to 4% by weight of a copolymerizable monoethylenically α,β-unsaturated acid selected from the group consisting of acrylic acid, methacrylic acid, itaconic acid, and aconitic acid, and the balance, to make 100%, of at least one other copolymerizable monoethylenically unsaturated compound selected from the group consisting of esters of acrylic acid with a member selected from the group consisting of cyclohexanol, benzyl alcohol and ($C_1$–$C_{18}$)-alkanols, esters of methacrylic acid with a member selected from the group consisting of cyclohexanol, benzyl alcohol and ($C_1$–$C_{18}$)-alkanols, styrene, vinyltoluene, α-methylstyrene, acrylonitrile and methacrylonitrile, and (B) 5 to 50% by weight of a thermosetting alcohol-modified aminoplast resin condensation product of formaldehyde with an aminotriazine alkylated by an alcohol having 3 to 6 carbon atoms.

4. A composition suitable for coating purposes comprising a solution in an organic solvent of 1 to 50% by weight of a compatible mixture of (A) 50 to 95% by weight of a thermoplastic copolymer of a mixture of methyl methacrylate, ethyl acrylate, a vinylaromatic compound having from 8 to 9 carbon atoms, 5 to 30% by weight of a compound of the formula

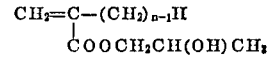

wherein $n$ is an integer having a value of 1 to 2, and 1 to 4% by weight of a copolymerizable monoethylenically α,β-unsaturated acid selected from the group consisting of acrylic acid, methacrylic acid, itaconic acid, and aconitic acid, and (B) 5 to 50% by weight of a thermosetting alcohol-modified aminoplast resin condensation product of formaldehyde with an aminotriazine alkylated by an alcohol having 3 to 6 carbon atoms.

5. A composition comprising a compatible mixture of (A) 50 to 95% by weight of a thermoplastic copolymer of a mixture of 5 to 30% by weight of β-hydroxypropyl methacrylate, 1 to 4% by weight of itaconic acid, and the balance, to make 100%, of at least one other copolymerizable monoethylenically unsaturated compound selected from the group consisting of esters of acrylic acid with a member selected from the group consisting of cyclohexanol, benzyl alcohol and (C₁–C₁₈)-alkanols, esters of methacrylic acid with a member selected from the group consisting of cyclohexanol, benzyl alcohol and (C₁–C₁₈)-alkanols, styrene, vinyltoluene, α-methylstyrene, acrylonitrile, and methacrylonitrile, and (B) 5 to 50% by weight of a thermosetting alcohol-modified aminoplast resin condensation product of formaldehyde with an aminotriazine alkylated by an alcohol having 3 to 6 carbon atoms.

6. A composition comprising a compatible mixture of (A) 50 to 95% by weight of a thermoplastic copolymer of a mixture of 5 to 30% by weight of β-hydroxypropyl methacrylate, 1 to 4% by weight of acrylic acid, and the balance, to make 100%, of at least one other copolymerizable monoethylenically unsaturated compound selected from the group consisting of esters of acrylic acid with a member selected from the group consisting of cyclohexanol, benzyl alcohol and (C₁–C₁₈)-alkanols, esters of methacrylic acid with a member selected from the group consisting of cyclohexanol, benzyl alcohol and (C₁–C₁₈)-alkanols, styrene, vinyltoluene, α-methylstyrene, acrylonitrile and methacrylonitrile, and (B) 5 to 50% by weight of a thermosetting alcohol-modified aminoplast resin condensation product of formaldehyde with an aminotriazine alkylated by an alcohol having 3 to 6 carbon atoms.

7. A composition comprising a compatible mixture of (A) 50 to 95% by weight of a thermoplastic copolymer, having a viscosity average molecular weight of about 10,000 to 130,000, of a mixture of 5 to 30% by weight of β-hydroxypropyl methacrylate, 1 to 4% by weight of methacrylic acid, and the balance to make 100%, of at least one other copolymerizable monoethylenically unsaturated compound selected from the group consisting of esters of acrylic acid with a member selected from the group consisting of cyclohexanol, benzyl alcohol and (C₁–C₁₈)-alkanols, esters of methacrylic acid with a member selected from the group consisting of cyclohexanol, benzyl alcohol and (C₁–C₁₈)-alkanols, styrene, vinyltoluene, α-methylstyrene, acrylonitrile and methacrylonitrile, and (B) 5 to 50% by weight of a thermosetting alcohol-modified aminoplast resin condensation product of formaldehyde with an aminotriazine alkylated by an alcohol having 3 to 6 carbon atoms.

8. A composition comprising a compatible mixture of (A) 50 to 95% by weight of a thermoplastic copolymer, having a viscosity average molecular weight of about 10,000 to 130,000, of a mixture of 5 to 30% by weight of β-hydroxypropyl acrylate, 1 to 4% by weight of itaconic acid, and the balance to make 100%, of at least one other copolymerizable monoethylenically unsaturated compound selected from the group consisting of esters of acrylic acid with a member selected from the group consisting of cyclohexanol, benzyl alcohol and (C₁–C₁₈)-alkanols, esters of methacrylic acid with a member selected from the group consisting of cyclohexanol, benzyl alcohol and (C₁–C₁₈)-alkanols, styrene, vinyltoluene, α-methylstyrene, acrylonitrile and methacrylonitrile, and (B) 5 to 50% by weight of a thermosetting alcohol-modified aminoplast resin condensation product of formaldehyde with an aminotriazine alkylated by an alcohol having 3 to 6 carbon atoms.

9. A composition comprising a compatible mixture of (A) 50 to 95% by weight of a thermoplastic copolymer, having a viscosity average molecular weight of about 10,000 to 130,000, of a mixture of 5 to 30% by weight of β-hydroxypropyl acrylate, 1 to 4% by weight of methacrylic acid, and the balance to make 100%, of at least one other copolymerizable monoethylenically unsaturated compound selected from the group consisting of esters of acrylic acid with a member selected from the group consisting of cyclohexanol, benzyl alcohol and (C₁–C₁₈)-alkanols, esters of methacrylic acid with a member selected from the group consisting of cyclohexanol, benzyl alcohol and (C₁–C₁₈)-alkanols, styrene, vinyltoluene, α-methylstyrene, acrylonitrile and methacrylonitrile, and (B) 5 to 50% by weight of a thermosetting alcohol-modified aminoplast resin condensation product of formaldehyde with an aminotriazine alkylated by an alcohol having 3 to 6 carbon atoms.

10. A composition comprising a compatible mixture of (A) 50 to 95% by weight of a thermoplastic copolymer of a mixture of 5 to 30% by weight of β-hydroxypropyl methacrylate, 1 to 4% by weight of itaconic acid, and the balance, to make 100%, of a mixture of methyl acrylate, styrene, and ethyl acrylate, and (B) 5 to 50% by weight of a thermosetting alcohol-modified aminoplast resin condensation product of formaldehyde with an aminotriazine alkylated by an alcohol having 3 to 6 carbon atoms.

11. A composition comprising a compatible mixture of (A) 50 to 95% by weight of a thermoplastic copolymer of a mixture of 5 to 30% by weight of a compound of the formula

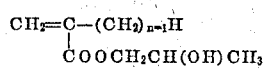

wherein $n$ is an integer having a value of 1 to 2, 1 to 4% by weight of a copolymerizable monoethylenically α,β-unsaturated acid selected from the group consisting of acrylic acid, methacrylic acid, itaconic acid, and aconitic acid, and the balance, to make 100%, of at least one other copolymerizable monoethylenically unsaturated compound selected from the group consisting of esters of acrylic acid with a member selected from the group consisting of cyclohexanol, benzyl alcohol and (C₁–C₁₈)-alkanols, esters of methacrylic acid with a member selected from the group consisting of cyclohexanol, benzyl alcohol and (C₁–C₁₈)-alkanols, styrene, vinyltoluene, α-methylstyrene, acrylonitrile and methacrylonitrile, and (B) 5 to 50% by weight of a thermosetting butylated melamine-formaldehyde condensate.

12. A composition comprising a compatible mixture of (A) 50 to 95% by weight of a thermoplastic copolymer of a mixture of 5 to 30% by weight of β-hydroxypropyl methacrylate, 1 to 4% by weight of itaconic acid, and the balance, to make 100%, of at least one other copolymerizable monoethylenically unsaturated compound selected from the group consisting of esters of acrylic acid with a member selected from the group consisting of cyclohexanol, benzyl alcohol and (C₁–C₁₈)-alkanols, esters of methacrylic acid with a member selected from the group consisting of cyclohexanol, benzyl alcohol and (C₁–C₁₈)-alkanols, styrene, vinyltoluene, α-methylstyrene, acrylonitrile and methacrylonitrile, and (B) 5 to 50% by weight of a thermosetting butylated melamine-formaldehyde condensate.

13. A composition comprising a compatible mixture of (A) 50 to 95% by weight of a thermoplastic copolymer of a mixture of 5 to 30% by weight of β-hydroxypropyl methacrylate, 1 to 4% by weight of itaconic acid, and the balance, to make 100%, of a mixture of methyl methacrylate, styrene, and ethyl acrylate, and (B) 5 to 50% by weight of a thermosetting butylated melamine-formaldehyde condensate.

14. A composition comprising a compatible mixture of (A) 50 to 95% by weight of a thermoplastic copolymer of a mixture of 5 to 30% by weight of a compound of the formula

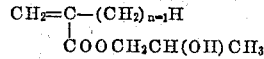

wherein $n$ is an integer having a value of 1 to 2, 1 to 4% by weight of a copolymerizable monoethylenically α,β-unsaturated acid selected from the group consisting of acrylic acid, methacrylic acid, itaconic acid, and aconitic acid, and the balance, to make 100%, of at least one other copolymerizable monoethylenically unsaturated compound selected from the group consisting of esters of acrylic acid with a member selected from the group consisting of cyclohexanol, benzyl alcohol and ($C_1$–$C_{18}$)-alkanols, esters of methacrylic acid with a member selected from the group consisting of cyclohexanol, benzyl alcohol and ($C_1$–$C_{18}$)-alkanols, styrene, vinyltoluene, α-methylstyrene, acrylonitrile and methacrylonitrile, and (B) 5 to 50% by weight of a thermosetting butylated benzoguanamine-formaldehyde condensate.

15. A composition comprising a compatible mixture of (A) 50 to 95% by weight of a thermoplastic copolymer of a mixture of 5 to 30% by weight of β-hydroxypropyl methacrylate, 1 to 4% by weight of itaconic acid, and the balance, to make 100%, of a mixture of methyl methacrylate and ethyl acrylate, and (B) 5 to 50% by weight of a thermosetting butylated aminotriazine-formaldehyde condensate.

16. A composition comprising a compatible mixture of (A) 50 to 95% by weight of a thermoplastic copolymer of a mixture of 5 to 30% by weight of β-hydroxypropyl methacrylate, 1 to 4% by weight of methacrylic acid, and the balance, to make 100%, of at least one other copolymerizable monoethylenically unsaturated compound selected from the group consisting of esters of acrylic acid with a member selected from the group consisting of cyclohexanol, benzyl alcohol and ($C_1$–$C_{18}$)-alkanols, esters of methacrylic acid with a member selected from the group consisting of cyclohexanol, benzyl alcohol and ($C_1$–$C_{18}$)-alkanols, styrene, vinyltoluene, α-methylstyrene, acrylonitrile and methacrylonitrile, and (B) 5 to 50% by weight of a thermosetting butylated melamine-formaldehyde condensate.

17. As an article of manufacture, a solid substrate having a surface thereof coated with and adhered to a baked compatible mixture of (A) 50 to 95% by weight of a thermoplastic copolymer, having a viscosity average molecular weight of about 10,000 to 130,000, of a mixture of 5 to 30% by weight of a compound of the formula $$CH_2=C-(CH_2)_{n-1}H$$
$$\phantom{CH_2=}|$$
$$\phantom{CH_2=}COOCH_2CH(OH)CH_3$$

wherein $n$ is an integer having a value of 1 to 2, 1 to 4% by weight of a copolymerizable monoethylenically α,β-unsaturated acid selected from the group consisting of acrylic acid, methacrylic acid, itaconic acid, and aconitic acid, and the balance, to make 100%, of at least one other copolymerizable monoethylenically unsaturated compound selected from the group consisting of esters of acrylic acid with a member selected from the group consisting of cyclohexanol, benzyl alcohol and ($C_1$–$C_{18}$)-alkanols, esters of methacrylic acid with a member selected from the group consisting of cyclohexanol, benzyl alcohol and ($C_1$–$C_{18}$)-alkanols, styrene, vinyltoluene, α-methylstyrene, acrylonitrile and methacrylonitrile, and (B) 5 to 50% by weight of a thermosetting alcohol-modified aminoplast resin condensation product of formaldehyde with a member selected from the group consisting of urea, N,N'-ethyleneurea, dicyandiamide, and aminotriazines, alkylated by an alcohol selected from the group consisting of cyclohexanol and alkanols having 1 to 6 carbon atoms.

18. An article as defined in claim 17 in which the substrate is a metal.

19. An article as defined in claim 17 in which the substrate is of steel.

References Cited in the file of this patent
UNITED STATES PATENTS

| | | |
|---|---|---|
| 2,147,154 | Fikentscher et al. | Feb. 14, 1939 |
| 2,681,897 | Frazier et al. | June 22, 1954 |
| 2,787,603 | Sanders | Apr. 2, 1957 |
| 2,923,653 | Matlin et al. | Feb. 2, 1960 |